United States Patent
Vauchel

[19]

[11] Patent Number: 5,852,928
[45] Date of Patent: Dec. 29, 1998

[54] THRUST REVERSER WITH EXTENDIBLE PIVOTING BAFFLE

[75] Inventor: Guy Bernard Vauchel, Le Havre, France

[73] Assignee: Societe Hispano-Suiza, Paris, France

[21] Appl. No.: 859,839

[22] Filed: May 19, 1997

[30] Foreign Application Priority Data

May 23, 1996 [FR] France ................................. 96 06391

[51] Int. Cl.$^6$ ....................................................... F02K 1/60
[52] U.S. Cl. ........................ 60/226.2; 60/230; 244/110 B; 239/265.29
[58] Field of Search .................................. 60/226.2, 230; 244/110 B; 239/265.29, 265.31

[56] References Cited

U.S. PATENT DOCUMENTS

| | | | |
|---|---|---|---|
| 3,280,561 | 10/1966 | Kutney | 60/226.2 |
| 4,073,440 | 2/1978 | Hapke | 60/226.2 |
| 5,255,510 | 10/1993 | Lardellier | 60/226.2 |

FOREIGN PATENT DOCUMENTS

| | | | |
|---|---|---|---|
| 2650861 | 2/1991 | France . | |
| 2625261 | 11/1992 | France . | |

*Primary Examiner*—Timothy Thorpe
*Assistant Examiner*—Ted Kim

*Attorney, Agent, or Firm*—Bacon & Thomas

[57] ABSTRACT

A thrust reverser is disclosed for a turbofan jet engine having a fan cowling with an inner surface and a rear edge, and a jet engine cowling having an outer surface spaced from the inner surface of the fan cowling so as to form an annular gas flow duct, the engine cowling extending rearwardly of the rear edge of the fan cowling. A first thrust reverser baffle is located rearwardly of the rear edge of the fan cowling and is pivotally attached to the engine cowling so as to be movable between a forward thrust position, wherein a first surface of the first thrust reverser baffle forms a portion of the outer surface of the engine cowling, and a reverse thrust position in which a first end of the first baffle moves away from the engine cowling such that the first baffle extends into the gas flow from the gas flow duct so as to redirect at least a portion of the gas flow in a reverse thrust direction. A second thrust reverser baffle having a second end is attached to and is movable with respect to the first thrust reverse baffle between a forward thrust position, wherein the second end of the second thrust reverser baffle is adjacent to the first end of the first thrust reverser baffle, and a reverse thrust position in which the second end is displaced from the first end in a direction away from the engine cowling, the second thrust reverser baffle being located adjacent and substantially parallel to the first thrust reverser baffle in both the forward and reverse thrust positions.

7 Claims, 3 Drawing Sheets

THRUST REVERSER WITH EXTENDIBLE PIVOTING BAFFLE

BACKGROUND OF THE INVENTION

The present invention relates to a thrust reverser for a turbofan-type turbojet engine, more particularly such a thrust reverser having an extendible pivoting baffle attached to the engine cowling.

Turbofan-type turbojet engines typically comprise a turbojet engine encased in a cowling wherein the engine, in addition to producing forward thrust via the hot exhaust gases, also drives a fan usually located at a front portion of the engine. The fan blades are enclosed in a fan cowling, at least a portion of the fan cowling being spaced from the engine cowling so as to define a generally annular gas flow duct. Rotation of the fan within the cowling forces air through the duct and augments the thrust generated by the turbojet engine.

In such engines having a high bypass radio, it is known to position a thrust reverser so as to act only the gases flowing through the gas flow duct between the fan cowling and the engine cowling. Such thrust reversers may comprise a pivoting thrust reverser door located on the fan cowling which is movable to a reverse thrust position in which the pivoting door redirect a portion of the gas flow through the annular duct outwardly through an opening in the fan cowling.

In some instances, the axial length of the fan cowling is less than that of the jet engine cowling such that the jet engine cowling extends rearwardly beyond the rearmost edge of the fan cowling. In such designs, it is difficult, if not impossible, to incorporate a pivoting door thrust reverser in the fan cowling due to the axially short length of such cowling. It is known to provide a thrust reverser baffle attached to the jet engine cowling adjacent to the end of the fan cowling so as to redirect at least a portion of the gas flowing through the gas flow duct to achieve the reverse thrust affects. The use of such an engine structure enables a high bypass ratio and reduces the overall bulk of the engine, specifically the outside diameter of the fan cowling. When in the forward thrust mode, such construction provides an aerodynamically efficient and continuous inner wall in the fan cowling to minimize flow disturbances therein, while at the same time lowering the weight of the assembly and making the construction and maintenance of the engine easier.

U.S. Pat. No. 3,280,561 and French Patent 2,625,261 disclose typical designs of this type. The displaceable thrust reverser baffles, in these instances, are mounted by means of stationary pivots on the cowling enclosing the jet engine. The hinges allow the baffles to pivot with respect to the engine cowling and may be located on the downstream, or rearward, side. However, in such a structure, displacing the thrust reverser baffle also entails obstructing the interior of the engine cowling, thereby degrading jet engine performance. If the hinges are located on the upstream side of the baffle, the deflection of the gases flowing through the gas flow duct when in the reverse thrust mode are implemented by the outside surfaces of the baffles, thereby precluding optimizing this shape for both reverse thrust and forward thrust modes.

SUMMARY OF THE INVENTION

A thrust reverser is disclosed for a turbofan jet engine having a fan cowling with an inner surface and a rear edge, and a jet engine cowling having an outer surface spaced from the inner surface of the fan cowling so as to form an annular gas flow duct, the engine cowling extending rearwardly of the rear edge of the fan cowling. A first thrust reverser baffle is located rearwardly of the rear edge of the fan cowling and is pivotally attached to the engine cowling so as to be movable between a forward thrust position, wherein a first surface of the first thrust reverser baffle forms a portion of the outer surface of the engine cowling, and a reverse thrust position in which a first end of the first baffle moves away from the engine cowling such that the first baffle extends into the gas flow from the gas flow duct so as to redirect at least a portion of the gas flow in a reverse thrust direction. A second thrust reverser baffle having a second end is attached to and is movable with respect to the first thrust reverse baffle between a forward thrust position, wherein the second end of the second thrust reverser baffle is adjacent to the first end of the first thrust reverser baffle, and a reverse thrust position in which the second end is displaced from the first end in a direction away from the engine cowling, the second thrust reverser baffle being located adjacent and substantially parallel to the first thrust reverser baffle in both the forward and reverse thrust positions.

A turbofan thrust reverser according to the invention enables efficient forward and reverse thrust performances without incurring the drawbacks of the known designs. The second thrust reverser baffle is slidable with respect to the first thrust reverser baffle such that, in their reverse thrust positions, the second baffle forms an extension of the first baffle, thereby increasing the efficiency of the reverse thrust operation. In their forward thrust positions, the second thrust reverser baffle is retracted towards the first thrust reverser baffle such that both are housed within the jet engine cowling with minimal disruption of the operation of the jet engine.

DETAILED DESCRIPTION OF THE PREFERRED EMBODIMENTS

Figure 1:
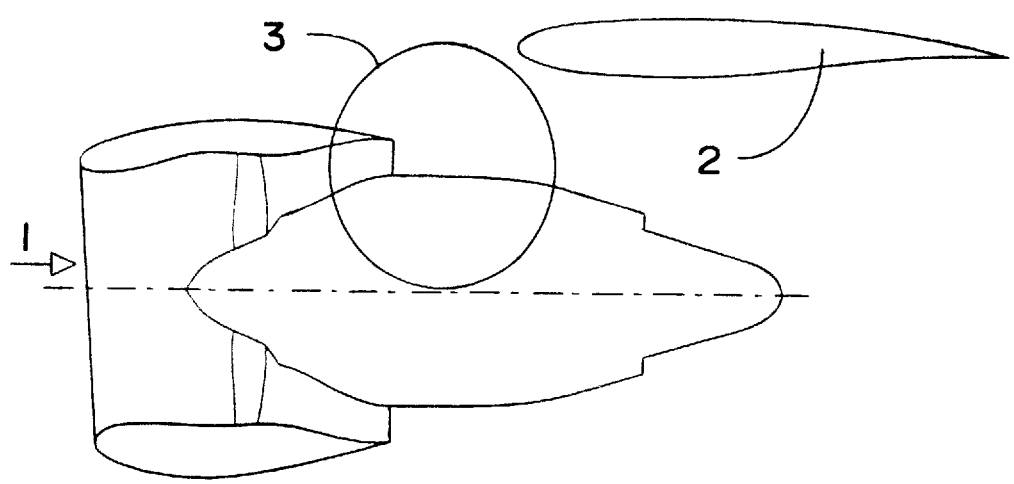
FIG. 1 is a schematic view illustrating a turbofan-type turbojet engine equipped with a thrust reverser according to the present invention.
Figure 2:
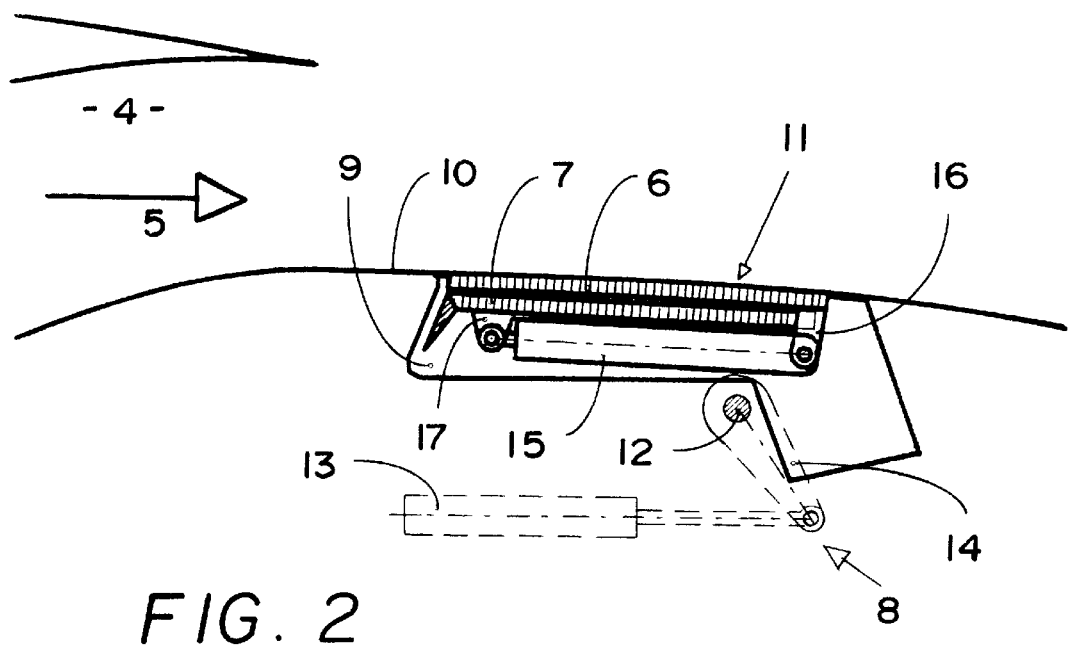
FIG. 2 is a partial, longitudinal, cross-sectional view illustrating the thrust reverser according to the present invention with the thrust reverser baffles in their forward thrust positions.

FIG. 1 illustrates a turbofan-type turbojet engine 1 mounted in known fashion under an aircraft wing 2 with the location of the thrust reverser baffles being denoted by the area 3. FIG. 2 illustrates in detail the area 3 of FIG. 1 wherein it can be seen that the fan cowling and engine cowling form an annular gas flow duct 4 through which the gases flow in the direction of the arrow 5 caused by rotation of the fan blades (not shown). The thrust reverser is mounted in the jet engine cowling 10 and comprises one or more outer thrust reverser baffles 6, one or more inner thrust reverser baffles 7 and a control system 8 to move the baffles between their forward and reverse thrust positions. FIG. 2 illustrates the baffles in their forward thrust positions wherein the thrust reverser components are located in a housing 9 formed within the jet engine cowling 10. In the forward thrust positions, the outer surface 11 of the outer baffle 6 is configured to form a portion of the outer surface of the engine cowling 10 so as to assure a smooth and aerodynamic air flow over this surface. As can be seen, the inner baffle 7 is adjacent and parallel to the outer baffle 6 and is located generally between forward and rear edges of the outer baffle 6 so as minimize the storage space required by the housing 9. Outer baffle 6 is pivotally attached to the engine cowling 10 by pivot shaft 12.

Figure 3:
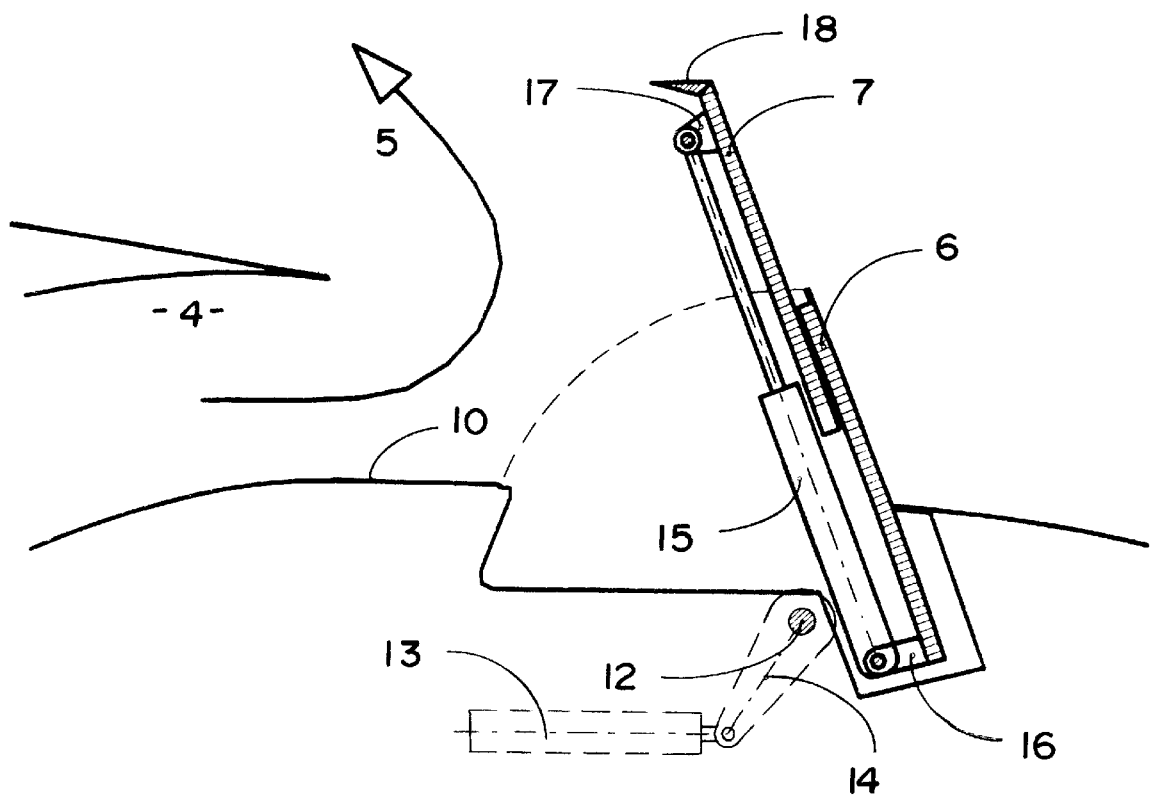
FIG. 3 is a view similar to FIG. 2 illustrating the thrust reverser baffles in their reverse thrust positions.
Figure 4:
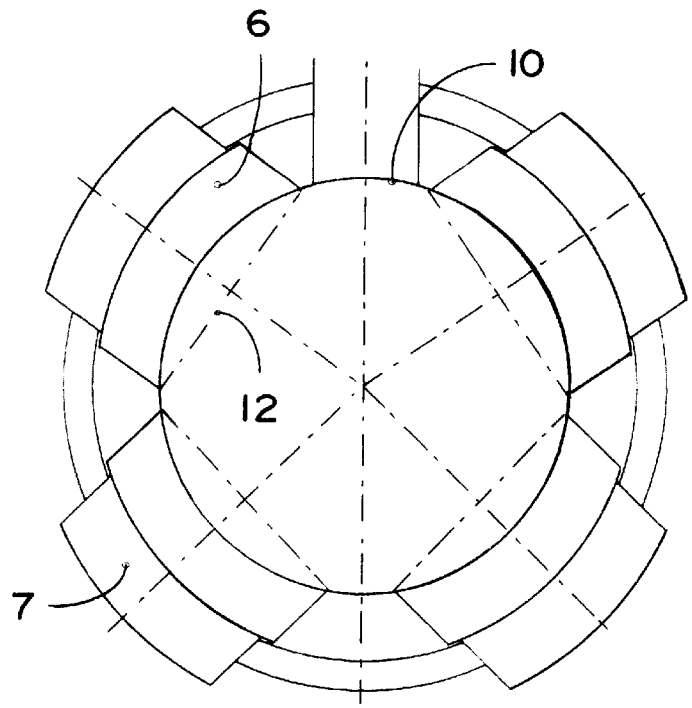
FIG. 4 is a rear view of an engine incorporating the thrust reverser with the thrust reverser doors in their positions illustrated in FIG. 3.

In the embodiment illustrated in FIGS. 2–4, the control system 8 for each outer panel 6 comprises an actuating cylinder 13 affixed between the stationary cowling 10 and a lever 14 affixed to pivot shaft 12. The actuating cylinder 13 has, in known fashion, an extendible and retractable rod attached to an end of the lever 14 such that movement of the rod causes pivoting of pivot shaft 12 which, in turn, moves thrust reverser baffles 6 and 7 between their forward and reverse thrust positions.

When moving to the reverse thrust position, illustrated in FIG. 3, from the forward thrust position, illustrated in FIG. 2, the rod of the actuating cylinder 13 is retracted which causes pivoting movement of pivot shaft 12 via lever 14 which, in turn, causes the outer baffle 6 to pivot into the position illustrated in FIG. 3. A displacement cylinder 15, mounted to a rear end of the outer baffle 6 by link 16 and to a forward end of the inner baffle 7 by link 17, has an extendible and retractable rod which, when extended, slides the inner baffle 7 with respect to the outer baffle 6 such that the forward end of the baffle 7 is displaced outwardly from the forward end of the baffle 6 in a direction away from the engine cowling 10. The inner baffle 7 may be slidably affixed to the outer baffle 6 by any known connection means. As can be seen, the movement of the inner baffle 7 with respect to the outer baffle 6 is substantially linear and serves to increase the area of the thrust reverser baffle in the reverse thrust position without requiring increased storage space in the jet engine cowling when in the forward thrust positions. The forward end of the inner baffle 7 may be equipped with a reverse thrust deflector 18 to optimize the directional control of the reverse thrust gas flow.

By utilizing appropriate known control techniques, the inner baffle 7 may be gradually deployed as the outer baffle 6 moves between the forward and reverse thrust positions, or may be deployed only after the outer baffle 6 reaches its reverse thrust position.

Although the thrust reverser is illustrated, in FIG. 4, as comprising four sets of baffles located circumferentially spaced around the engine cowling, this number may vary in accordance with each particular application on a specific aircraft. Variations of the disclosed embodiment are also possible without exceeding the scope of the invention. For instance, actuating cylinder 13 could be located to the rear of the thrust reverser baffles 6 and 7, and pivot shaft 12. The control of the thrust reverser baffles may also be implemented by other means such as directly connecting the actuating cylinder 13 to the outer baffle 6, or to the inner baffle 7. Also, the displacement actuator 15 may be affixed at its downstream, or rearward end to the engine cowling 10 and connected to the inner panel 7 via a linkage mechanism to achieve the desired displacement, in particular by aligning the attachment point of the displacement actuator 15 to the pivot shaft 12 of the outer panel 6.

The thrust reverser according to the present invention has many advantages over the known systems. Installation is advantageous if the fan cowling is axially shorter than the engine cowling and the displaceable thrust reverser baffles are located outside of the exhaust nozzle and do not require special acoustic treatment. The control of the gas flow in the reverse thrust mode can be optimized by appropriate shaping of the deflectors 18 and by modifying the shape and/or projection length of the inner baffles 7. The inside surface of the inner baffle 7 can be contoured and can be formed with one or more gas flow guiding elements to achieve the desired thrust reversal performance. The stresses exerted on the system are lowered when the thrust reverser is moving toward its reverse thrust position, due to the smaller area of the outer baffle 6, thereby enabling the entire system to be reduced in weight.

Figure 5:
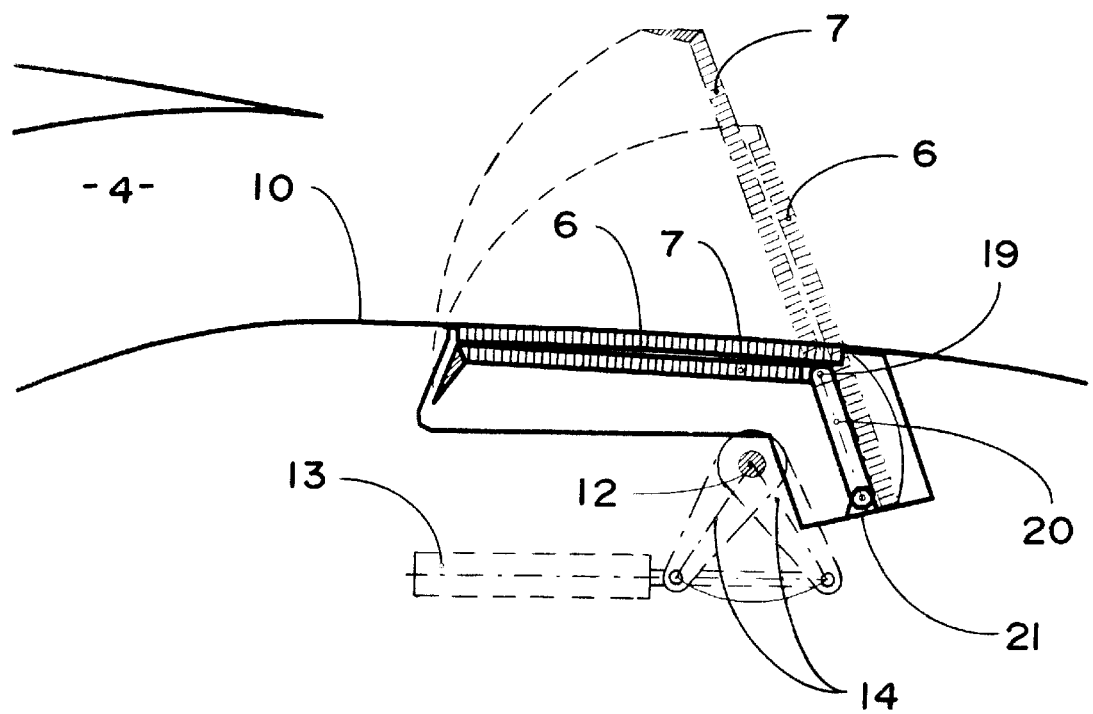
FIG. 5 is a partial, longitudinal, cross-sectional view of a second embodiment of the thrust reverser according to the present invention.

Under operating conditions in which there is no restriction on the extension of the inner baffle 7 while the outer baffle 6 is moving toward its reverse thrust position, the embodiment illustrated in FIG. 5 may be utilized. In this embodiment, outer baffle 6 is pivotally connected to the engine cowling 10 via pivot shaft 12 which, as in the previously described embodiment, is actuated by actuating cylinder 13 and lever 14. Inner baffle 7 is, again, slidably connected to the outer baffle 6, but instead of utilizing a separate displacement cylinder 15, as in the previous embodiment, inner baffle 7 is connected to the cowling 10 by linkrod 20 at pivots 19 and 21. As a result of this connection, when the outer panel 6 moves from the forward thrust position, illustrated in solid lines in FIG. 5, to the reverse thrust position, illustrated in dashed lines, inner baffle 7 will be extended as illustrated in the dashed lines.

The foregoing description is provided for illustrative purposes only and should not be construed as in any way limited this invention, the scope of which is defined solely by the appended claims.

I claim:

1. A thrust reverser for a turbofan jet engine having a fan cowling with an inner surface and a rear edge, and an engine cowling having an outer surface spaced from the inner surface of the fan cowling so as to form an annular gas flow duct therebetween, the engine cowling extending rearwardly of the rear edge of the fan cowling, the thrust reverser comprising:

a) a first thrust reverser baffle located rearwardly of the rear edge of the fan cowling and pivotally attached to the engine cowling so as to be movable between a forward thrust position wherein a first surface of the first thrust reverser baffle forms a portion of the outer surface of the engine cowling, and a reverse thrust position wherein a first end of the first baffle moves away from the engine cowling such that the first baffle extends into the gas flow from the gas flow duct so as to redirect at least a portion of the gas flow into a reverse thrust direction; and, b) a second thrust reverser baffle having a second end and movable with respect to the first thrust reverser baffle between a forward thrust position wherein the second end is adjacent to the first end of the first thrust reverser baffle and a reverse thrust position wherein the second end is displaced from the first end in a direction away from the engine cowling, the second thrust reverser baffle located adjacent to and substantially parallel to the first thrust reverser baffle in both the forward and reverse thrust positions.

2. The thrust reverser of claim 1 further comprising a movement mechanism connected between the engine cowling and the first thrust reverser baffle for moving the first thrust reverser baffle between the forward and reverse thrust positions.

3. The thrust reverser of claim 2 wherein the movement mechanism comprises an actuating cylinder having an extendible and retractable rod.

4. The thrust reverser of claim 2 further comprising a displacement mechanism acting on the second thrust reverser baffle to move the second thrust reverser baffle between the forward and reverse thrust positions.

5. The thrust reverser of claim 4 wherein the displacement mechanism comprises a link rod connected to the engine cowling and to the second thrust reverser baffle.

6. The thrust reverser of claim 4 wherein the displacement mechanism comprises a displacement cylinder having an extendible and retractable rod, and connected between the first and second thrust reverser baffles.

7. The thrust reverser of claim 1 further comprising a reverse thrust deflector extending from the second end of the second thrust reverser baffle.

* * * * *